United States Patent [19]

Kato et al.

[11] Patent Number: 4,895,775
[45] Date of Patent: Jan. 23, 1990

[54] INTEGRAL FUEL CELL ELECTRODE AND MATRIX AND A METHOD FOR MANUFACTURING SAME

[76] Inventors: Hiroshi Kato; Ichiro Komada, both of Okayama City 703, Japan

[21] Appl. No.: 148,979

[22] Filed: Jan. 27, 1988

[30] Foreign Application Priority Data

Jan. 29, 1987 [JP] Japan .................................. 62-17229

[51] Int. Cl.$^4$ ............................................. H07M 4/86
[52] U.S. Cl. ...................................... 429/41; 429/42; 427/115; 29/623.5
[58] Field of Search .................... 429/41, 42; 427/115; 29/623.5

[56] References Cited

U.S. PATENT DOCUMENTS

| | | | |
|---|---|---|---|
| 4,001,042 | 1/1977 | Trocciola et al. ................... | 427/115 |
| 4,038,463 | 7/1977 | Laramine et al. ................. | 429/41 X |
| 4,091,176 | 5/1978 | Alfenaar ............................ | 429/42 X |
| 4,518,765 | 5/1985 | Solomon et al. .................. | 429/42 X |
| 4,529,672 | 7/1985 | Howard et al. ....................... | 429/42 |

Primary Examiner—Stephen J. Kalafut
Attorney, Agent, or Firm—Mortenson & Uebler

[57] ABSTRACT

An integrally molded, combined fuel cell electrode and matrix is provided having a matrix layer containing 3 to 20 weight percent polytetrafluoroethylene (PTFE) and 80 to 97 weight percent inorganic powder, the matrix being integral with an electrode layer of PTFE containing a catalyst. The electrode layer preferably is 40 to 90 weight percent of electrically conductive fine powder, on which the catalyst has been supported, and 10 to 60 weight percent PTFE. Also provided is a method for manufacture of the integral fuel cell electrode and matrix of the invention.

14 Claims, 2 Drawing Sheets

INTEGRAL FUEL CELL ELECTRODE AND MATRIX AND A METHOD FOR MANUFACTURING SAME

BACKGROUND OF THE INVENTION

The present invention concerns a fuel cell electrode and matrix, and specifically concerns an integral structure comprising a sheet-form electrode and matrix, and a method for manufacturing the same.

In the case of fuel cell electrodes, the fuel cell reaction proceeds as a result of the formation of interfaces between three phases, i.e., reaction gas, electrolyte and catalyst. Accordingly, an interface between the gas and the electrolyte must be formed inside the electrode. Conventionally, an electrode consisting of (a) a powdered conductive substance containing a catalytic substance, and (b) a polytetrafluoroethylene (PTFE) resin has been used for this purpose. Such electrodes have generally been formed as follows: a mixture of finely powdered PTFE and a powdered conductive substance containing a catalytic substance is uniformly mixed with an appropriate solvent, and is then painted or sprayed onto a substrate consisting of a porous carbon material (e.g., porous carbon paper) which has been subjected to a water-repelling treatment. Alternatively, uniform molding may be achieved by screen printing or the mixture may be further kneaded following mixing, spread to form a sheet, and integrally molded by pressing onto a substrate of the aforementioned type. Electrodes obtained by these manufacturing methods have almost no strength in themselves. Accordingly, a porous carbon substrate has been essential, and an electrode could only be formed on the basis of the strength of this substrate.

Characteristics such as those described in (1) through (5) below are required in a fuel cell matrix.

(1) The matrix must be stable against hot concentrated phosphoric acid under the operating conditions of the fuel cell.

(2) The matrix must be an electronic insulating material, and must also have sufficiently high ionic conductivity.

(3) The matrix must have the ability to block the permeation of gas when impregnated with phosphoric acid; i.e., the matrix must have a high foam pressure.

(4) The matrix must have a high affinity for phosphoric acid, so that the osmotic diffusion of phosphoric acid is rapid.

(5) The matrix must possess mechanical strength and be formable into a thin layer.

Matrix materials using a phosphoric-acid-resistant inorganic powder such as SiC or $Ta_2O_5$, and a small amount of PTFE as a binder are conventionally well known as matrix materials which provide such required characteristics. Generally, such matrix materials are formed as follows: an appropriate amount of an appropriate solvent is added to and mixed with the aforementioned inorganic powder and a minute amount of PTFE; this mixture is sprayed or painted on the electrode so that it adheres in the form of a thin film; and, finally the solvent is removed. Alternatively, a method may be employed in which the mixture is further kneaded and spread to form a sheet, after which said sheet is pressure-bonded to the electrode. Furthermore, matrix materials are also known in which a fine carbonaceous powder such as carbon black is used in order to raise the foam pressure described in (3) above, and in order to increase the osmotic diffusion described in (4) above. In this case, a PTFE binder is used as described above, and a sheet formed in the same manner is combined with a matrix using the aforementioned fine inorganic powder so that a two-layer or three-layer matrix is obtained.

However, in all of the abovementioned conventional matrix materials, PTFE is used as a binder. Since this PTFE has strong water-repelling characteristics, large amounts of binder PTFE cannot be used in order to achieve the aforementioned affinity for phosphoric acid described in (4) above. Accordingly, the mechanical strength described in (5) above is extremely low. As a result, a matrix function can be achieved only by forming the matrix on a rigid electrode substrate or electrode. Accordingly, both reliability and yield are unavoidably low.

SUMMARY OF THE INVENTION

An integrally molded, unitary fuel cell electrode and matrix is provided comprising a matrix layer containing 3 to 20 weight percent PTFE and 80 to 97 weight percent inorganic powder integrally formed on one side of an electrode layer of PTFE containing a catalyst. The thickness of the matrix layer is preferably 10 to 250 micrometers. The electrode layer preferably comprises 40 to 90 weight percent of electrically conductive fine powder on which the catalyst has been supported and 10 to 60 weight percent PTFE. The inorganic powder may include SiC, $Ta_2O_5$, $ZrO_2$ and carbon fine powder. Most preferably, the electrode layer is PTFE containing fine carbon powder on which a platinum catalyst has been supported. The matrix layer may contain carbon fine powder and have integrally formed, on its side opposite the electrode layer, a layer of PTFE containing an inorganic powder which possesses electrical insulating properties. The inorganic powder which possesses insulating properties may be SiC, $Ta_2O_5$ and $ZrO_2$. The matrix layer may have a second counter electrode layer of PTFE containing a catalyst integrally formed on the second side of the matrix layer opposite the electrode layer. The unitary combination may have a layer of unsintered, expanded, porous PTFE containing electrically conductive fine powder integrally formed on the side of the electrode opposite that of the matrix. This conductive fine powder may be carbonaceous fine powder. The electrode layer may have openings therethrough filled with the material of the matrix layer. A plurality of the integral, molded unitary fuel cell electrode and matrix combinations is also provided, all in integral combination.

A method for manufacturing an integrally molded fuel cell electrode and matrix is provided comprising forming a catalyst layer element which contains PTFE and a catalyst, and forming a matrix composition layer which contains 3 to 20 weight percent PTFE and 80 to 97 weight percent inorganic powder, prepared as elements whose thicknesses are greater than the thicknesses of the respective layers in the desired finished product, and laminating these elements together by rolling so that the elements are reduced to their final thicknesses and simultaneously formed into an integral, unitary body. The elements which form the catalyst layer and the matrix composition layer are preferably formed by a paste extrusion molding process. The catalyst layer element and matrix composition layer element are preferably prepared as elements whose thicknesses are greater than the thicknesses of the respective layers in the desired finished product, and whose thicknesses are in accordance with a ratio determined from the thickness ratio of the respective layers in the finished product, forming openings in the catalyst layer element so that the openings pass through the element, and filling these openings with the same composition as the aforementioned matrix composition layer during the lamination and thinning by rolling.

Figure 1:
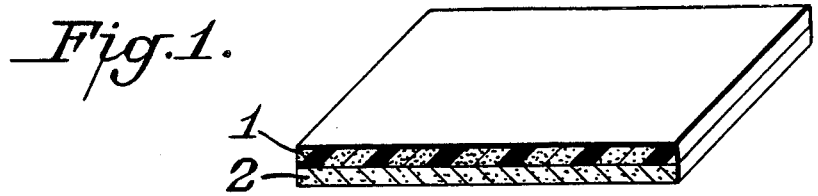
FIG. 1 is a perspective view, partly in cross section of an integrally molded, combined fuel cell electrode and matrix according to one embodiment of the invention.

DETAILED DESCRIPTION OF THE INVENTION AND PREFERRED EMBODIMENTS WITH REFERENCE TO THE DRAWINGS

An integrally molded, combined fuel cell electrode and matrix is provided having a matrix layer containing 3 to 20 weight percent polytetrafluoroethylene (PTFE) and 80 to 97 weight percent inorganic powder, the matrix being integral with an electrode layer of PTFE containing a catalyst. The electrode layer preferably is 40 to 90 weight percent of electrically conductive fine powder, on which the catalyst has been supported, and 10 to 60 weight percent PTFE. Also provided is a method for manufacture of the integral fuel cell electrode and matrix of the invention.

Specifically, the present invention comprises an integrally molded body of a fuel cell electrode and a matrix, which is characterized by the fact that a matrix composition layer which contains 3 to 20 weight percent polytetrafluoroethylene resin and 80 and 97 weight percent inorganic powder which is resistant to phosphoric acid electrolyte, and which has a thickness of 10 to 250 microns, is integrally formed on one side of a catalyst layer which contains at least a polytetrafluoroethylene resin and a catalyst.

The present invention also includes a method for manufacturing an integrally molded body comprising a fuel cell electrode and a matrix, which is characterized by the fact that (a) (i) a catalyst layer element which contains a polytetrafluoroethylene resin and a catalyst, and (ii) a matrix composition layer element which contains 3 to 20 weight percent polytetrafluoroethylene resin and 80 to 97 weight percent inorganic powder with electrolyte resistance, are prepared as elements whose thicknesses are greater than the thicknesses of the respective layers in the desired finished product, and whose thicknesses are in accordance with a ratio determined from the thickness ratio of the respective layers in the finished product, and (b) these elements are laminated and compressed and thinned by rolling so that the elements are reduced to their final thicknesses and, at the same time, formed into an integral body.

Since a matrix composition layer which contains PTFE (in the same manner as the catalyst layer containing PTFE) and which contains an inorganic powder which is resistant to corrosive electrolyte is integrally formed on the catalyst layer, an electrode sheet which has a matrix function is obtained. The electrode and the matrix are obtained by the same formation method, and the PTFE mixture ratio of the catalyst layer (which acts as an electrode) is sufficiently increased over that of the matrix. As a result, sufficient mechanical strength in the composite is obtained. Accordingly, the drawback of a relatively weak mechanical strength of the matrix is remedied by forming it as an integral body during the formation of the matrix and electrode. Furthermore, the conditions of contact with the electrode are improved as are its handling characteristics.

The required strength is obtained by including 3 percent or more PTFE in the matrix composition layer. Stability against the electrolyte is obtained by setting the upper limit of the PTFE content at 20 percent, so that 80 percent or more inorganic powder with electrolyte resistance is included in this layer.

The thickness of the aforementioned matrix composition layer is set at 10 microns or greater so that the functioning of this layer as a fuel cell matrix is insured. Furthermore, the necessary thin-layer properties in the matrix are obtained by limiting the thickness of this layer to 250 microns or less.

The catalyst layer element and the matrix composition layer element are initially prepared as elements whose thicknesses are greater than the thicknesses of the respective layers in the desired finished product, and whose thicknesses are in accordance with a ratio determined from the thickness ratio of the respective layers in the finished product, and these elements are laminated together and thinned by rolling so that they are reduced to their final thicknesses. As a result, a product which conforms to the required thickness ratio, which is formed as an integral body and which has the respective characteristics required in the electrode and matrix in conventional fuel cells is obtained simply and reliably.

Furthermore, the PTFE mixture ratio in the electrode portion is sufficiently increased over that in the matrix, so that sufficient mechanical strength is obtained. As a result of the abovementioned formation into an integral body, favorable contact between the electrode and the matrix is obtained, and its handling characteristics are improved.

The following is a detailed description of the present invention and preferred embodiments as previously described.

Specifically, a mixture obtained by mixing 50 to 300 parts by weight of a liquid lubricant (e.g., any of various phthalic acid esters, alcohols, glycols or hydrocarbons) with 100 parts by weight of a mixture containing 40 to 90 weight percent fine conductive powder (e.g., carbon black) on which a catalyst has been supported beforehand and 10 to 60 weight percent finely powdered PTFE is prepared as a sheet-form electrode element in which the PTFE has been thoroughly fibrilized by a process including extrusion or rolling (or both). In this case, the thickness of this sheet is set at a value which is greater than the final desired thickness. Separately, a mixture obtained by mixing 20 to 100 parts by weight of a liquid lubricant (e.g., any of various phthalic acid esters, alcohols, glycols or hydrocarbons) with 100 parts by weight of a mixture which contains 80 to 97 weight percent inorganic powder with electrolyte resistance, e.g., SiC, $Ta_2O_5$, $ZrO_2$ or a carbonaceous powder (carbon black or graphite, etc.), or a mixture of such substances, and 3 to 20 weight percent PTFE is prepared as a matrix composition layer element whose thickness is greater than the final desired thickness, by a process similar to that used for the aforementioned electrode. The number of sheets used is not limited to two. A plurality of sheets with different mixture components or compositions may be prepared. However, in order to insure ease of rolling subsequent processing, it is desirable to limit the number of layers to a maximum of approximately five. However, the number of layers used may be appropriately increased or decreased in accordance with the conditions involved in individual cases. The above-mentioned sheet-form electrode element and matrix composition layer element are prepared as sheets whose thicknesses will conform to the thickness ratio of the desired finished product. These sheets are laminated and are rolled in this laminated state so that the respective sheet elements are formed into an integral unit, and are at the same time compressed by the rollers and reduced to the desired thicknesses. Next, the liquid lubricant, which was added as described above, is removed by heating or extraction, producing a sheet-form product in which an electrode and a matrix are formed as an integral body. The basic configuration of the integrally molded body consisting of a fuel cell electrode and matrix of the present invention, which is produced as described above, is illustrated in FIG. 1. In this body, a catalyst layer 1 which acts as an electrode, and a layer 2 which contains an inorganic powder resistant to electrolyte, are bonded into an integral unit. Since both of these layers contain PTFE, and since the integral body is obtained by a rolling-thinning process as described above, the final product is obtained as a desirable integrally molded body.

In the abovementioned integrally molded body of the present invention, the components of the catalyst layer 1 which acts as an electrode may consist only of (a) a fine carbonaceous powder supporting a catalyst such as platinum and (b) PTFE. If necessary, however, a fine carbonaceous powder previously subjected to a water-repelling treatment using fluororesin such as PTFE or a PTFE powder, may also be included in the mixture. In any case, the catalyst layer 1 which forms such an electrode composition layer is essential in the present invention.

Furthermore, the aforementioned layer 2 which contains an inorganic powder resistant to electrolyte, and which is obtained from the aforementioned matrix composition layer element by rolling, must have a composition which comprises at least (a) an inorganic powder possessing electrolyte resistance and (b) PTFE. However, it is also desirable to include a composition layer comprising a carbonaceous powder and PTFE in order to increase the foam pressure and electrolyte retention properties. In this case, the positioning of the carbonaceous powder/PTFE layer on the side which allows contact with the electrode is desirable from the standpoints of reinforcement by the electrode and achievement of a uniform electrode potential.

Figure 2:
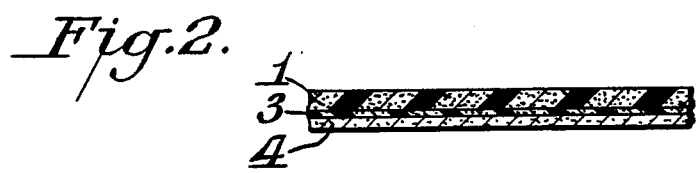
FIGS. 2-5 are cross-sectional views of alternative embodiments according to the invention.

Such a configuration of the present invention is illustrated in FIG. 2. The catalyst layer 1 is the same as in the configuration However, the layer 2 which contains an inorganic powder is replaced by the following: a carbonaceous-powder-containing layer 3 which consists of a carbonaceous powder and PTFE (as described above) is positioned on one side of the catalyst layer 1, and a layer 4 of PTFE containing an inorganic powder containing layer which has electronically insulating properties as well as electrolyte resistance formed on the other side of the aforementioned carbonaceous-powder-containing layer 3. These two layers, 3 and 4, take the place of the matrix composition layer 2 in the configuration illustrated in FIG. 1. Each of the layers, 1, 3 and 4, contains PTFE. By laminating and rolling these layers, a product which constitutes an appropriately integrated body is obtained as in the case of the configuration illustrated in FIG. 1.

Figure 4:
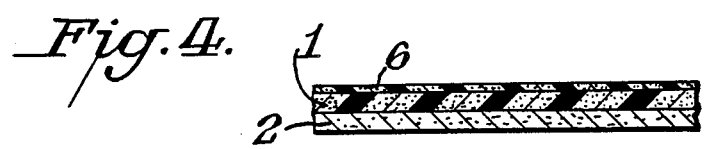

In the present invention, furthermore, a composition layer 6 which acts as a waterproof layer (e.g., an unsintered, porous PTFE layer 6 which consists of unsintered PTFE, an unsintered, porous PTFE film, or a PTFE film containing carbon fine powder) can be formed on the opposite surface of the aforementioned catalyst layer 1 (which acts as an electrode layer) from the aforementioned inorganic powder containing layer 2 (which acts as a matrix composition layer) as shown in FIG. 4.

Figure 3:
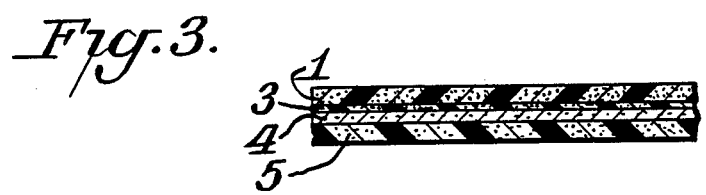
Figure 5:
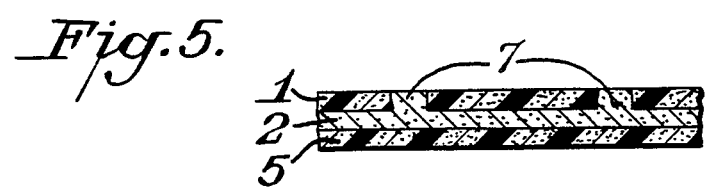

Furthermore, as is shown in FIG. 3, a counter-electrode catalyst layer 5 consisting of an electrode composition which forms a counter-electrode can be formed on the opposite surface of the aforementioned inorganic powder layer 2 (which acts as a matrix composition layer) from the aforementioned catalyst layer 1 (which acts as an electrode layer), and these layers can be formed into an integral body by rolling and compression. In this case, impregnation with the electrolyte may proceed from the end surface of the integrally molded electrode/matrix sheet, or may proceed directly via this electrode surface. Furthermore, in cases involving, for example, impregnation with phosphoric acid, it is desirable that the impregnation with phosphoric acid be performed at an elevated temperature in order to lower the viscosity and surface tension, and thus increase the impregnation of the sheet. This electrolyte impregnability is further improved in cases where three components are used in the electrode composition, i.e., (a) a fine carbonaceous powder supporting the aforementioned catalyst, (b) PTFE, and (c) a fine carbonaceous powder which has been subjected to a water-repelling treatment. It appears that this is attributable to the formation of hydrophilic channels (channels with an affinity for the electrolyte) by the fine carbonaceous powder supporting the catalyst. In the present invention, furthermore, electrolyte supply paths consisting of the same composition as the matrix may be formed inside the electrode surface in order to improve the electrolyte impregnability even more positively. Specifically, fine slits or holes may be formed in the electrode composition sheet which acts as a counter-electrode before the sheet is formed into an integral unit with the other sheets. Afterward, it is necessary merely to laminate and roll the sheets as described above. As a result of this operation, the slits or holes are expanded, and the adjacent matrix composition components are pushed into the slits or holes so that penetrating portions 7 are formed as shown in FIG. 5. As a result, electrolyte supply paths are formed. Accordingly, the density, size and positions of the aforementioned slits or holes may be set in accordance with the enlargement ratio to which they are rolled.

Below, examples of manufacture of the present invention will be described with reference to a phosphoric acid type fuel cell. However, it is clear that the present invention could also be applied to other electrolytic fuel cells, e.g., alkaline fuel cells, etc.

EXAMPLE 1

A mixture consisting of 60 weight percent carbon fine powder supporting 10% of a platinum catalyst and 40 weight percent PTFE was obtained by co-aggregation and drying. Solvent naphtha was mixed with 100 parts by weight of this mixture as a liquid lubricant. Afterward, the resulting paste was extruded and then rolled to produce a long sheet-form electrode composition with a width of 14 cm and a thickness of 0.86 mm. Separately, a mixture consisting of 96 weight percent finely powdered x-SiC and 4 weight percent PTFE was similarly obtained by co-aggregation and drying, and a liquid lubricant was added as described above. The resulting paste was extruded and rolled to produce a long sheet-form matrix composition sheet with a width of 14 cm and a thickness of 0.6 mm. The abovementioned electrode composition sheet and matrix composition sheet were laminated and rolled, and were then heated to 300° C. so that the respective liquid lubricants were volatilized and removed. As a result, an electrode/matrix integrally molded body of the present invention was obtained which had an overall thickness of 0.25 mm, an electrode composition layer thickness of approximately 0.15 mm and a matrix composition layer thickness of approximately 0.1 mm. When an attempt was made to peel this integrally molded body at the interface between the two layers, peeling occurred not at the interface between the two layers, but rather within the matrix layer. Furthermore, the strength of this integrally molded sheet in the direction of its width was 0.23 kg/mm$^2$, demonstrating that the sheet had sufficient strength to withstand handling. Furthermore, when the matrix layer of this integrally molded body was impregnated with phosphoric acid and the foam pressure was measured, a value of 0.7 kg/cm$^2$ was obtained. On the other hand, when an attempt to form a sheet with a thickness of 0.1 mm using only a matrix composition sheet, for purposes of comparison, the strength of the sheet was weak. As a result, pinholes were generated, and numerous cracks were generated when the liquid lubricant was removed.

EXAMPLE 2

A mixture consisting of 95 weight percent graphite carbon black and 5 weight percent PTFE was obtained by mixing by co-aggregation and drying. Solvent naphtha was added to this mixture as a liquid lubricant. Afterward, the resulting paste was extruded and then rolled to produce a long carbonaceous matrix composition sheet with a width of approximately 14 cm and a thickness of 0.45 mm. This sheet was laminated on top of the electrode composition sheet with a thickness of 0.86 mm obtained in Example 1, and a sheet obtained by further rolling the matrix composition sheet obtained in Example 1 to a thickness of 0.35 mm was laminated on top of this. The laminated sheets were then rolled and heated to 300° C. so that the liquid lubricants of the respective layers were removed by volatilization. As a result, an integrally molded electrode/matrix sheet of the present invention was obtained which had an overall film thickness of 280 microns, an electrode layer thickness of 150 microns, a carbonaceous matrix composition layer thickness of approximately 70 microns and an SiC matrix composition layer thickness of approximately 60 microns. When the matrix layer side of this sheet was impregnated with phosphoric acid at a temperature of 120° C. and the foam pressure was measured, a foam pressure value of 2.3 kg/cm$^2$ was obtained.

EXAMPLE 3

Figure 6:
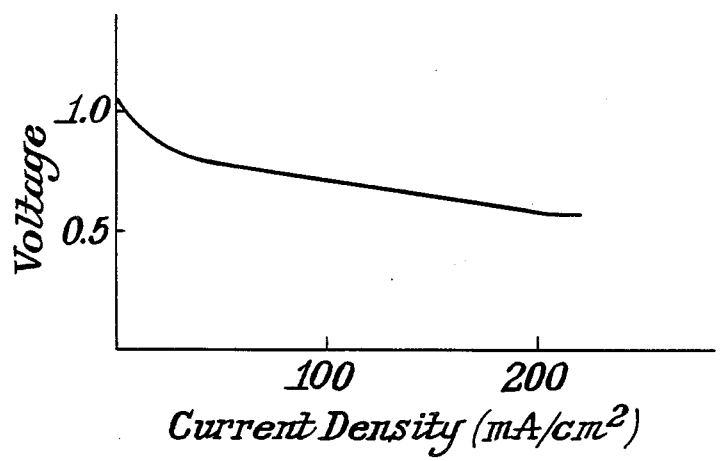
FIGS. 6-8 are graphs of performance characteristics of fuel cells employing various configurations of products according to the invention.

Fibrous carbon sheets or fibrous carbon paper which had been subjected to a water-repelling treatment with PTFE was bonded to the electrode surfaces of the integrally molded electrode/matrix sheets prepared in the abovementioned Examples 1 and 2 by hot-pressing at 360° C. Next, with the integrally molded sheet of Example 1 used as the air pole side and the integrally molded sheet of Example 2 used as the fuel pole side, a unit cell of an air-hydrogen fuel cell was constructed by causing the matrix surfaces to face each other with separately prepared carbon paper installed between the two sheets. Next, the matrix layers were impregnated with phosphoric acid by impregnating the carbon paper installed between the two sheets with phosphoric acid. Afterward, electricity was generated by supplying air and hydrogen, and the resulting performance was measured. As is shown in FIG. 6, characteristics of 0.6V or greater at a current density of 200 mA/cm$^2$ were obtained. Thus, it was confirmed that the respective electrode layers and matrix layers in the integrally molded sheets were sufficiently functional.

EXAMPLE 4

Respective aqueous dispersions of 70 weight percent acetylene carbon black and 30 weight percent PTFE were prepared. These dispersions were thoroughly mixed and the resulting mixture was dried. Next, the mixture was heated to 370° C. so that the PTFE was sintered and at the same time caused to adhere to the acetylene black. Next, this substance was pulverized to produce a water-repellent acetylene black with a mean secondary particle size of approximately 100 microns. A mixture consisting of 30 weight percent water-repellent acetylene black of this type, 45 weight percent carbon black (supporting platinum) and 25 weight percent PTFE was added to this mixture as a liquid lubricant as in Example 1. Afterward, the resulting paste was extruded and rolled to produce an electrode composition sheet with a thickness of 0.9 mm. Next, a carbonaceous matrix composition sheet and an SiC matrix composition sheet similar to those used in Example 2 were laminated, in that order, on one side of the aforementioned electrode composition sheet, and another sample of the electrode composition sheet was laminated on top of this. The laminated sheets were then rolled and heated so that the liquid lubricant was removed by volatilization. As a result, an integrally molded electrode/matrix sheet of the present invention was obtained which had an overall thickness of 400 microns, an electrode layer thickness of approximately 140 microns, for each layer, a carbonaceous matrix layer thickness of approximately 65 microns and an SiC matrix layer thickness of approximately 55 microns.

Figure 7:
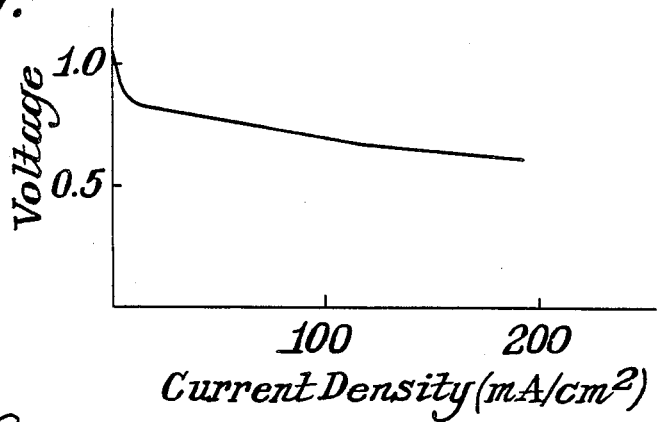

When the volume resistivity of the electrode layers of this sheet was measured, a value of 1.02 ohm-cm was obtained. Despite this fact, the resistance between the two poles was more or less infinitely large. Thus, it was confirmed that the SiC matrix layer functions as an electronics insulating layer. Next, this integrally molded electrode/matrix sheet was caused to float for two hours on the surface of phosphoric acid heated to 120° C. Afterward, the sheet was removed and the foam pressure was measured. The value obtained was 2.5 kg/cm$^2$. Thus, it was confirmed that the matrix layers were thoroughly impregnated with phosphoric acid via the electrodes, and that the matrix layers were able to function as a matrix. Furthermore, carbon paper and rib-equipped separators were applied to both surfaces of this integrally molded sheet to form a unit cell of an air-hydrogen fuel cell, and the performance of this cell was measured. As is shown in FIG. 7, similar characteristics of 0.6V or greater at a current density of 200 mA/cm$^2$ were obtained. Thus, it was confirmed that both the electrode layers and the matrix layers were sufficiently functional.

EXAMPLE 5

An unsintered, expanded, porous PTFE film with a thickness of 8 microns, a void ratio of 90% and a mean pore diameter of approximately 1 micron was laminated to one surface of the electrode composition sheet with a thickness of 0.9 mm obtained in Example 4. Afterward, slits with a width of 0.5 mm and a length of 10 mm were formed in a zigzag pattern in a lateral direction at 10 mm intervals along the direction of length of this sheet. Next, an SiC matrix composition sheet and a carbonaceous matrix composition sheet similar to those used in Example 4 were laminated, in that order, on the opposite surface of the aforementioned electrode composition sheet from the aforementioned unsintered, expanded, porous PTFE film. Next, another sample of the aforementioned electrode composition sheet and another sample of the aforementioned unsintered, expanded, porous PTFE film were laminated, in that order, on top of this. Next, these laminated sheets were rolled in the abovementioned lateral direction to produce an integrally molded electrode/matrix sheet of the present invention which had an overall film thickness of 400 microns. In this sheet, furthermore, the previously formed slits in the electrode layer were transformed into long slits approximately 0.5 mm×50 mm, and the slits were filled with the SiC matrix composition from the internal layer, so that a flat surface was formed. Furthermore, the positioning of the slits was transformed to approximately 10 mm intervals in the direction of length and approximately 10 mm intervals in the direction of width.

Figure 8:
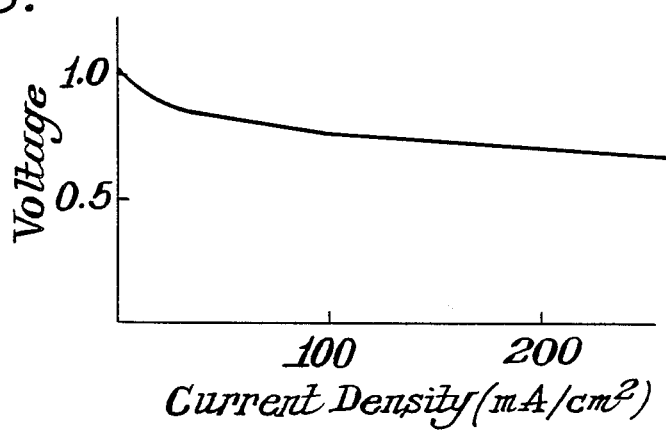

In addition, an electrode substrate equipped with ribs, in which the ribs were hydrophilic and the other parts were water-repellent, was separately prepared beforehand. This substrate was positioned so that the direction of the aforementioned ribs was perpendicular to the direction of the long slits of the aforementioned sheet of the present invention, and carbon paper impregnated with PTFE was installed on the opposite surface. This configuration was then bonded into an integral unit by hot-pressing at 360° C., thus forming a unit fuel cell. When the resistance value between the poles of this fuel cell was measured, the resistance was found to be more or less infinitely large. Next, the aforementioned rib portions were impregnated with phosphoric acid, so that the matrix layers were impregnated with phosphoric acid via the electrolyte supply paths formed by the aforementioned slits. Next, an electricity generating test was performed by passing air, which is an oxidizing agent, through the rib-side surface, and installing a rib-equipped separator on the opposite surface and passing hydrogen through this separator. The results obtained are as shown in FIG. 8. Thus, it was confirmed that this sheet had characteristics which were superior even to those of the sheets illustrated in FIGS. 6 and 7. Furthermore, roughly the same characteristics were indicated after this cell had been continuously operated for 600 hours at a current density of 200 mA/cm$^2$. No deterioration was observed.

As a result of the present invention, which is constructed as described above, a matrix, which in the past has been able to function only by being formed on a pre-formed electrode substrate/electrode, and which has been limited in terms of the degree to which reliability and performance (low resistance, formation of a thin film) could be improved because of a weak mechanical strength, can now be formed as an integral unit with an electrode which has sufficient strength. As a result, the present invention makes it possible to reduce the number of processes required in manufacture, increase the yield and achieve high reliability. At the same time, the performance of the matrix itself is also improved, and the problem of interfacial resistance with respect to the electrode is eliminated. Thus, fuel cell unit assembly is greatly facilitated, and the present invention makes a great contribution to the improvement of overall performance and reduction of costs. Thus, the present invention has great industrial merit.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. An integrally molded fuel cell electrode and matrix comprising:
   (a) a matrix layer containing 3 to 20 weight percent PTFE and 80 to 97 weight percent inorganic powder integrally formed on one side of
   (b) an electrode layer of PTFE containing a catalyst, wherein said matrix layer contains carbon fine powder and has integrally formed, on its side opposite said electrode layer, a layer of PTFE containing a second inorganic powder which possesses electrical insulating properties.

2. The integral combination of claim 1 wherein the thickness of said matrix layer is 10 to 250 micrometers.

3. The integral combination of claim 1 wherein the electrode layer comprises 40 to 90 weight percent of electrically conductive fine powder on which said catalyst has been supported and 10 to 60 weight percent PTFE.

4. The integral combination of claim 1 wherein said inorganic powder is selected from the class consisting of SiC, Ta$_2$O$_5$, ZrO$_2$ and carbon fine powder.

5. The integral combination of claim 1 wherein said electrode layer is PTFE containing fine carbon powder on which said catalyst has been supported.

6. The integral combination of claim 1 wherein said catalyst is platinum.

7. The integral combination of claim 1 wherein said second inorganic powder which possesses electrical insulating properties is selected from the class consisting of SiC, Ta$_2$O$_5$ and ZrO$_2$.

8. An integrally molded fuel cell electrode and matrix comprising:
   (a) a matrix layer containing 3 to 20 weight percent PTFE and 80 to 97 weight percent inorganic powder integrally formed on one side of
   (b) an electrode layer of PTFE containing a catalyst, wherein said matrix layer has a second counter electrode layer of PTFE containing a catalyst integrally formed on the second side of said matrix layer opposite said electrode layer.

9. The integral combination of claim 1 having a layer of unsintered, expanded, porous PTFE containing electrically conductive fine powder integrally formed on the side of said electrode opposite that of said matrix.

10. The integral combination of claim 9 wherein said conductive fine powder is carbonaceous fine powder.

11. The integral combination of claim 1 wherein said electrode layer has openings therethrough filled with the material of said matrix layer.

12. A method for manufacturing an integrally molded fuel cell electrode and matrix comprising:
(a) (i) forming a catalyst layer element which contains PTFE and a catalyst, (ii) forming a matrix composition layer element adjacent said catalyst layer element which contains 3 to 20 weight percent PTFE and 80 to 97 percent inorganic powder, prepared as elements whose thicknesses are greater than the thicknesses of the respective layers in the desired finished product, and whose thicknesses are in accordance with a ratio determined from the thickness ratio of the respective layers in said finished product, and (iii) forming a third layer element adjacent said matrix layer, on its side opposite said electrode layer, the third layer comprising PTFE containing a second inorganic powder which possesses electrical insulating properties, and
(b) laminating said elements together by rolling so that said elements are reduced to their final thicknesses and simultaneously formed into an integral body.

13. The method for manufacturing an integrally molded fuel cell electrode and matrix, as defined in claim 12, wherein said elements which form said catalyst layer and said matrix composition layer are formed by a paste extrusion molding process.

14. The method for manufacturing an integrally molded fuel cell electrode and matrix, as defined in claim 12, wherein
(a) said catalyst layer element and matrix composition layer element are prepared as elements whose thicknesses are greater than the thicknesses of the respective layers in the desired finished product, and whose thicknesses are in accordance with a ratio determined from the thickness ratio of the respective layers in said finished product,
(b) forming openings in the catalyst layer element so that said openings pass through said element, and
(c) filling said openings with the same composition as the aforementioned matrix composition layer during the lamination and thinning by rolling.

* * * * *